Patented Mar. 22, 1932

1,850,537

UNITED STATES PATENT OFFICE

WLODZIMIERZ MARYAN DANIEWSKI, OF KIELCE, POLAND, ASSIGNOR TO CORNING GLASS WORKS, OF CORNING, NEW YORK, A CORPORATION OF NEW YORK

GLASS ARTICLE AND METHOD OF TREATING THE SAME

No Drawing. Application filed December 22, 1928, Serial No. 328,051, and in France March 5, 1928.

The object of this invention is a method of overcoming the violent ebullition of liquids during boiling or evaporation in vessels of glass, silica, or porcelain.

This method consists in applying an adherent film of silica gel to the bottom of the vessel.

It is known that "silica gel" is hydrated silicic acid, which is formed when a little hydrochloric acid is added to a concentrated aqueous solution of an alkaline silicate (soluble glass).

In order to obtain an adherent and stable film on the bottom of the vessel it is preferable to proceed as follows:— a. The interior surface of the article is cleaned as carefully as possible.

b. A few ccs. of a solution of sodium silicate (specific gravity 25° Beaumé) is poured in. The solution is obtained by mixing the commercial solution, specific gravity 36° Beaumé, with water.

c. The vessel is rotated and drained leaving just sufficient liquid to form a thin uniform layer at the bottom.

d. The bottom of the vessel is then gradually warmed with a Bunsen burner so that an opaque film is formed.

e. The vessel is then allowed to cool.

f. The film is then carefully washed with water to remove any soluble matter.

g. Concentrated hydrochloric acid is then poured in and brought to boiling and shaken so that the attack is complete.

h. The acid is poured off and without washing the vessel is inverted and inside surface of the vessel heated by a Bunsen burner.

The bottom of the vessel will be found to be covered with a stable film.

When the film loses its activity all that is necessary is to pass the bottom of the vessel over a flame for a few minutes to restore the activity.

This device which is the subject of this invention has the following advantages:

1. It regulates the ebullition of liquids.
2. It prevents overheating.
3. It keeps the temperature of boiling liquids throughout the mass a few hundredths of a degree above the boiling point.
4. It facilitates the distillation of liquids which decompose near the boiling point.

The process is applicable to all vessels having a vitreous surface which permits a certain amount of penetration and consequently a firm adherence of the film.

What I claim is:—

1. A glass vessel in which liquid is boiled having on its inner surface an adherent film of silica gel.

2. The hereinbefore described process of preventing the bumping of a liquid when heated which consists in heating the liquid in a glass vessel having a film of silica gel adherent thereto.

In testimony whereof I hereunto affix my signature.

WLODZIMIERZ MARYAN DANIEWSKI.